US012480468B2

(12) United States Patent
Gordon

(10) Patent No.: US 12,480,468 B2
(45) Date of Patent: Nov. 25, 2025

(54) WIND TURBINE WITH ROTATIONAL AXIS PERPENDICULAR TO THE WIND FLOW

(71) Applicant: AIRDE PTE LTD, Singapore (SG)

(72) Inventor: Ian Gordon, Ightham (GB)

( * ) Notice: Subject to any disclaimer, the term of this patent is extended or adjusted under 35 U.S.C. 154(b) by 0 days.

(21) Appl. No.: 18/565,047

(22) PCT Filed: May 30, 2022

(86) PCT No.: PCT/IB2022/055064
§ 371 (c)(1),
(2) Date: Nov. 28, 2023

(87) PCT Pub. No.: WO2022/249156
PCT Pub. Date: Dec. 1, 2022

(65) Prior Publication Data
US 2024/0240610 A1    Jul. 18, 2024

(30) Foreign Application Priority Data

May 28, 2021 (GB) .................................... 2107681

(51) Int. Cl.
*F03D 3/04* (2006.01)
(52) U.S. Cl.
CPC ......... *F03D 3/0427* (2013.01); *F03D 3/0409* (2013.01); *F05B 2240/213* (2013.01); *F05B 2240/51* (2013.01); *F05B 2240/9111* (2013.01)
(58) Field of Classification Search
CPC ................ F03D 3/0409; F03D 3/0427; F05B 2240/213; F05B 2240/9111
See application file for complete search history.

(56) References Cited

U.S. PATENT DOCUMENTS

| 63,498 | A | * | 4/1867 | Gallup | ............ | F03D 3/00 415/165 |
| 94,624 | A | * | 9/1869 | Maxwell | ............ | F03D 3/00 415/164 |
| 232,558 | A | * | 9/1880 | Smith | ............ | F03D 3/00 415/4.2 |

(Continued)

FOREIGN PATENT DOCUMENTS

| CA | 2579587 A1 | 8/2006 |
| EP | 0522994 A1 | 1/1993 |

(Continued)

OTHER PUBLICATIONS

International Patent Application No. PCT/IB2022/055064; Int'l Search Report and Written Opinion; dated Sep. 8, 2022; 12 pages.

*Primary Examiner* — Oluseye Iwarere
*Assistant Examiner* — Thomas K Quigley
(74) *Attorney, Agent, or Firm* — BakerHostetler

(57) ABSTRACT

The invention described herein pertains to a housing for a vertical-axis wind turbine, a vertical-axis wind turbine, and an apparatus comprising a housing and a vertical-axis wind turbine. For example, the disclosure below provides more efficient electricity generation from a vertical-axis wind turbine assembly. Increases in efficiency may be achieved by the housing through novel angled louvres and integrally housed electrical stators. Increases in efficiency may also be achieved through a magnetic spindle bearing and Savonius blade geometry. The turbine may be sized and configured for attachment to existing structures.

20 Claims, 5 Drawing Sheets

(56) References Cited

U.S. PATENT DOCUMENTS

| | | | | |
|---|---|---|---|---|
| 1,382,591 A * | 6/1921 | Ackermann | ............ | F03D 3/0418 415/4.2 |
| 1,595,578 A * | 8/1926 | Sovereign | ............... | F03D 15/10 415/208.5 |
| 3,938,907 A * | 2/1976 | Magoveny | ............ | F03D 3/0427 416/186 A |
| 4,486,143 A * | 12/1984 | McVey | ................ | F03D 3/0427 415/53.3 |
| 4,551,631 A * | 11/1985 | Trigilio | .................... | F03D 9/11 415/4.4 |
| 4,834,610 A * | 5/1989 | Bond, III | ................. | F03D 7/06 415/53.3 |
| 6,242,818 B1 * | 6/2001 | Smedley | ................... | F03D 7/06 290/55 |
| 6,870,280 B2 * | 3/2005 | Pechler | ................ | F03D 3/0427 290/55 |
| 7,344,353 B2 * | 3/2008 | Naskali | ................... | F03D 13/20 415/4.2 |
| 7,969,036 B2 * | 6/2011 | Chung | .................... | F03D 9/25 290/55 |
| 7,988,413 B2 * | 8/2011 | Haar | ...................... | F03D 7/028 290/55 |
| 8,258,647 B2 * | 9/2012 | Haar | ...................... | F03D 7/028 290/55 |
| 8,338,976 B2 * | 12/2012 | Kazadi | ................... | F03D 80/70 290/44 |
| 8,373,294 B2 * | 2/2013 | Haar | .................... | F03D 7/0232 290/44 |
| 8,487,470 B2 * | 7/2013 | Grassman | ................ | F03D 9/25 290/55 |
| 8,513,826 B2 * | 8/2013 | Mazur | ...................... | F03D 9/25 417/423.4 |
| 8,587,145 B2 * | 11/2013 | Andujar | ................... | F03D 9/10 290/55 |
| 8,608,425 B2 * | 12/2013 | Mazur | ..................... | F03D 3/005 415/4.2 |
| 8,608,426 B2 * | 12/2013 | Mazur | ..................... | F03D 15/10 415/4.2 |
| 9,022,721 B2 * | 5/2015 | Zha | ........................... | F03D 7/06 415/4.4 |
| 9,041,239 B2 * | 5/2015 | Epstein | ..................... | F03D 9/25 290/55 |
| 9,133,821 B2 * | 9/2015 | Mazur | .................... | F03D 3/062 |
| 9,284,943 B2 * | 3/2016 | Zha | ...................... | F03D 3/0409 |
| 9,404,475 B2 * | 8/2016 | Mazur | ................... | F03D 9/11 |
| 9,410,530 B2 * | 8/2016 | Mazur | ................... | F03D 9/11 |
| 9,605,652 B2 * | 3/2017 | Mazur | ................... | F03D 3/04 |
| 9,803,624 B2 * | 10/2017 | Mazur | ................... | F03D 9/12 |
| 9,810,201 B2 * | 11/2017 | Mazur | ................... | F03D 3/0409 |
| 10,024,302 B2 * | 7/2018 | Zha | ...................... | F03D 3/0427 |
| 2002/0109358 A1 | 8/2002 | Roberts | | |
| 2004/0036297 A1 * | 2/2004 | John | ...................... | F03D 80/70 290/55 |
| 2006/0222483 A1 * | 10/2006 | Seiford, Sr. | ............. | F03D 3/005 415/4.4 |
| 2006/0275105 A1 | 12/2006 | Roberts et al. | | |
| 2008/0309090 A1 * | 12/2008 | Stern | ...................... | F03D 80/40 290/55 |
| 2009/0322095 A1 * | 12/2009 | Mazur | ..................... | F03D 3/005 290/55 |
| 2009/0324383 A1 * | 12/2009 | Mazur | ..................... | F03D 3/04 415/4.2 |
| 2010/0111689 A1 * | 5/2010 | Davis | ...................... | F03D 3/062 415/229 |
| 2010/0213722 A1 | 8/2010 | Scott | | |
| 2010/0213723 A1 * | 8/2010 | Kazadi | ................... | H02K 7/183 290/55 |
| 2010/0270805 A1 * | 10/2010 | Kazadi | ...................... | F03D 3/06 290/55 |
| 2010/0295316 A1 * | 11/2010 | Grassman | ............... | H02K 7/183 290/55 |
| 2011/0031756 A1 * | 2/2011 | Gabrys | ................... | F03D 80/70 290/55 |
| 2011/0084494 A1 * | 4/2011 | Andujar | .................. | F03D 80/70 290/55 |
| 2011/0115232 A1 * | 5/2011 | vanderDeen | ............. | F03D 9/25 290/55 |
| 2011/0133474 A1 * | 6/2011 | Haar | ...................... | F03D 7/0232 290/55 |
| 2011/0260455 A1 * | 10/2011 | Haar | ........................ | F03D 3/06 290/44 |
| 2011/0260463 A1 * | 10/2011 | Haar | ...................... | F03D 7/028 290/55 |
| 2012/0098270 A1 * | 4/2012 | Song | ...................... | F03D 80/70 290/55 |
| 2012/0119504 A1 * | 5/2012 | Vigaev | ................... | F03D 3/0418 415/45 |
| 2012/0153632 A1 * | 6/2012 | Suttisiltum | ............. | F03D 80/70 290/55 |
| 2013/0115069 A1 * | 5/2013 | Zha | ...................... | F03D 3/0409 415/191 |
| 2013/0140826 A1 * | 6/2013 | Mazur | .................... | F03D 9/255 290/55 |
| 2013/0147202 A1 * | 6/2013 | Mazur | .................. | F03D 3/0409 290/55 |
| 2013/0294886 A1 | 11/2013 | Martino | | |
| 2014/0077504 A1 * | 3/2014 | Epstein | ................... | F03D 80/70 290/55 |
| 2014/0105722 A1 * | 4/2014 | Mazur | ..................... | F03D 3/062 415/151 |
| 2014/0105724 A1 * | 4/2014 | Mazur | ..................... | F03D 13/20 415/4.2 |
| 2014/0145449 A1 * | 5/2014 | Cole | ......................... | F03D 9/25 290/55 |
| 2014/0203565 A1 * | 7/2014 | Mazur | ................... | F03D 1/0675 290/55 |
| 2015/0159628 A1 * | 6/2015 | Appa | ........................ | F03D 9/25 290/55 |
| 2015/0226182 A1 * | 8/2015 | Mazur | ...................... | F03D 9/12 290/55 |
| 2015/0226184 A1 * | 8/2015 | Mazur | ..................... | F03D 80/00 415/121.3 |
| 2015/0233346 A1 * | 8/2015 | Zha | ........................ | F03D 3/062 415/4.4 |
| 2015/0330360 A9 * | 11/2015 | Mazur | ..................... | F03D 9/255 415/4.2 |
| 2016/0084227 A1 | 3/2016 | Krippene | | |
| 2016/0195065 A1 * | 7/2016 | Zha | ........................... | F03D 7/06 415/130 |
| 2016/0348648 A1 * | 12/2016 | Mazur | .................... | F03D 80/00 |
| 2016/0348649 A1 * | 12/2016 | Mazur | .................... | F03D 15/10 |
| 2018/0066631 A1 * | 3/2018 | Mazur | .................... | F03D 17/00 |
| 2019/0360465 A1 * | 11/2019 | Moore | ................... | F03D 3/005 |

FOREIGN PATENT DOCUMENTS

| | | |
|---|---|---|
| FR | 2876162 A1 | 4/2006 |
| JP | 2016-079966 A | 5/2016 |
| KR | 2006-0050090 A | 5/2006 |
| WO | WO 2006/089425 A1 | 8/2006 |
| WO | WO 2009/056896 A2 | 5/2009 |
| WO | WO 2011/001375 A1 | 1/2011 |
| WO | WO 2016/174799 A1 | 11/2016 |
| WO | WO 2017/195145 A1 | 11/2017 |

* cited by examiner

WIND TURBINE WITH ROTATIONAL AXIS PERPENDICULAR TO THE WIND FLOW

CROSS-REFERENCE TO RELATED APPLICATIONS

The present application is the United States National Stage Application of International Patent Application No. PCT/IB2022/055064, filed May 30, 2022, "Wind Turbine with Rotational Axis Perpendicular to the Wind Flow;" which claims priority to Great Britain Patent Application No. 2107681.5, filed May 24, 2021. The entireties of all foregoing applications are incorporated herein by reference for any and all purposes.

TECHNICAL FIELD

The invention described herein pertains to a housing for a vertical-axis wind turbine, a vertical-axis wind turbine, and an apparatus comprising a housing and a vertical-axis wind turbine. For example, the disclosure below provides more efficient electricity generation from a vertical-axis wind turbine assembly.

BACKGROUND

A vertical-axis wind turbine (VAWT) is a known device used to convert energy in atmospheric wind into electrical energy. In contrast to the more common horizontal-axis wind turbines (HAWT), VAWTs can be more compact and thus less of an eyesore, making them more attractive as an option for renewable energy generation in both urban and rural areas. VAWTs are also less dangerous to wildlife, such as birds and bats, and can operate effectively while producing less noise pollution than HAWTs.

In general, a VAWT of a certain size will be less efficient at converting wind energy into electrical energy than a HAWT of that same size. This is, in part, because many HAWTs are able to rotate to face the wind direction such that, at any one time, all of their blades experience a wind direction that encourages them to turn. The blades of a VAWT, however, due to the vertical axis, cannot all be subjected to a wind direction that encourages them to turn. In fact, the advancing blades will be urged against the direction of rotation. Therefore, while VAWTs are advantageous for a number of reasons, HAWTs remain the more popular form of wind turbine.

Some known VAWTs, for example as described in US 2006/275105 A and US 2002/109358 A, attempt to employ stator blades, or louvres, to direct the wind more favourably towards the turbine rotor blades. VAWTs such as these make use of curved rotor blades, and direct the incoming air across these blades in order to generate a lift force on the blade. As the airstream is curved by the geometry of the underside of the blade, an area of high pressure is produced under the blade causing the blade to rotate.

Known VAWT louvres may be parallel, or close to parallel, to the oncoming airflow and to the radius of the VAWT. In other words, the louvres may be angled at close to 180° to the radius, for example between 110° and 180°, as described by some of the publications mentioned herein. In other words, known housings may use louvres which have a lower angle of attack to the incoming wind. Often, this is due to the desire to produce a lift force on the rotor blades of the VAWT, which relies on laminar flow across the underside of the blade. As a result, the incoming airstream must be angled by a relatively small degree, such that it enters the rotor with significant radial velocity and can flow across the blades.

Further inefficiencies are introduced throughout turbines, regardless of their axes, for example by friction between moving components and by cogging effects between magnetic components of the generator. Many designs simply accept such losses and attempt to minimise their effects and/or compensate for them elsewhere in the design. Some attempts, for example in US 2009/261597 A, have been made to produce frictionless rotors; here, by suspending the rotor on a pool of water.

Furthermore, turbines of any kind often require significant structures in order to position the blades in locations where they can experience high wind velocity. Most often, turbines are integrated atop support structures. The support structures provide elevation and are often situated in remote locations, such as offshore wind farms, in order to maximise the efficiency of the turbine once installed. While the turbines may then be more efficient, the up-front resource, capital, labour, and time costs associated with installing the turbines is a major hurdle to both private and public entities who wish to install more renewable sources of energy. A major part of this cost is elevating the turbine and generator to a position at which the wind energy is sufficient to turn the turbine blades. This also limits where the turbines can be positioned, because a significant, otherwise unoccupied, ground level footprint is required.

In view of the above, there exists a need for a VAWT with increased efficiency which retains and improves the environmental pollution and wildlife conservation advantages associated with this design.

SUMMARY

In accordance with the invention, there is provided a housing for use with a vertical-axis wind turbine, the housing defining a vertical axis and being configured to surround a vertical-axis wind turbine, the housing comprising: a top portion; a base portion; and a plurality of louvres arranged circumferentially around the vertical axis and disposed between the top portion and the base portion, wherein: each louvre comprises an inner edge and an outer edge; the inner edges of each louvre form a first circle; each louvre is arranged at angle $\alpha$, wherein $\alpha$ is between about 85° and about 100°; and wherein, $\alpha$ is the angle between a straight line between the inner and outer edge of each louvre and a radius of the first circle at the inner edge of the louvre.

The straight line between the inner and outer edge of each louvre will, for a straight louvre, follow the shape of the louvre along its length. For a curved louvre, the straight line between the inner and outer edge of each louvre will not follow the shape of the louvre along its entire length, as will be discussed in greater detail below.

Louvres angled at between about 85° and about 100°, for example between 85° and 100°, are advantageous because they increase the Venturi effect as the incoming air is directed from the outer edges of the louvres to the inner edges. Angle $\alpha$ may be, for example, 85°, 86°, 87°, 88°, 89°, 90°, 91°, 92°, 93°, 94°, 95°, 96°, 97°, 98°, 99°, or 100°, or any fractional angle therebetween. Angle $\alpha$ may alternatively be, for example, between 90° and 100°, or between 90 and 95°.

At the outer circumference of the housing, the cross-sectional area between two louvres is larger than the cross-sectional area at the inner circumference of the housing. Therefore, as the air passes between these cross-sections, its pressure decreases and its speed increases according to the Bernoulli effect. When a VAWT is positioned within the housing, the increased velocity of the air, relative to any given wind speed, and the redirection of the air by the louvres encourages faster rotor rotation, thereby increasing the kinetic energy of the rotor, which in turn will increase the energy recovered by a generator attached to the rotor.

The present invention, in contrast, maximises the usable force of the incoming airstream to be applied directly to the underside of the blades. The force applied to the blades is improved by increasing the velocity of the airstream and by turning the incoming air to more closely align with the direction of motion of the rotor blades. It has been found that both can be achieved with a louvre angle, α, of between about 85° to about 100°. The minimum cross-sectional area through which the incoming air must travel is determined, in part, by the angle of the louvres, so the housing improves utilisation of the Bernoulli effect by reducing the cross-sectional area at the inner edges of the louvres. The direction of travel of the rotor blade, at any one time, is tangential to the circle plotted by its rotation. The incoming air, however, is perpendicular to this direction of motion. Therefore, it is advantageous to apply a more significant change of direction to the incoming air than has previously been achieved.

It is further advantageous to use louvres angled between about 85° and about 100° because they provide greater environmental shielding than louvres at a greater angle. Visually, the louvres better screen the moving rotor within the housing, thereby lessening the visual pollution of a VAWT positioned within the housing. The same is true for noise pollution. The likelihood of wildlife strikes on rotor blades of the VAWT can also be reduced by better screening of the moving rotor; advantageous both for the wildlife and for maintenance of the VAWT. Finally, the volume of incoming air flowing against the direction of rotation of the retreating blades of the rotor is decreased due to the increased screening.

If the louvres are angled significantly below 90°, the louvres begin to encroach on the space available for the rotor blades to rotate. This necessitates smaller rotor blades turning in a smaller radius, decreasing efficiency. At about 85°, the aerodynamic gains due to the Bernoulli effect begin to be outweighed by the decreasing blade size, thus it is advantageous to angle the louvres above about 85°.

It will be readily understood that, in the context of the present invention, "vertical" as used herein is parallel to the axis about which the VAWT rotates. For horizontal air flow across a flat surface on which the VAWT and housing are placed, for example, across the ground if the VAWT and housing were to be placed on the ground, vertical is perpendicular to the direction of the air flow.

In some embodiments, α is about 90°, for example 90°. It has been found that 90° is particularly advantageous to produce both the increased efficiencies, and environmental improvements, described above. In particular, by turning the incoming airstream through 90°, the direction of the airstream can be at or close to parallel to the tangential direction of motion of rotor blades of a VAWT within the housing, thereby increasing the speed of the rotor blades and the efficiency of the VAWT.

In some embodiments, each louvre is curved, such that the straight line between the inner and outer edge of each louvre is a chord of the louvre, and α is the angle between the chord of the louvre and the radius of the first circle at the inner edge of the louvre. In other words, the shape of the louvre has one or more points of inflection.

The Coandă effect describes the tendency of fluids, such as air, to be attracted to and follow an adjacent flat or convex surface. In doing so, the fluid may accelerate and may draw further fluid into the stream through the area of low pressure produced by the curvature of the stream and the entrained fluid. The incoming airstream to a housing having louvres with curvature may therefore follow the geometry of the louvre, and accelerate. Acceleration of the stream is advantageous for reasons already presented. Furthermore, entraining a greater volume of fluid into the housing provides yet further energy to be recovered by the generator via the rotor. Finally, encouraging the fluid to follow a curved louvre may encourage the flow to remain laminar, thereby retaining more of its speed as its direction is changed by the louvres.

In some embodiments, the direction of curvature of each louvre reverses once, such that each louvre is S-shaped. In other words, the shape of the louvre has two points of inflection. It has been found that an S-shaped louvre is particularly efficient for producing the Coandă effect and achieving the associated advantages.

In some embodiments, the plurality of louvres comprises at least 6, at least 8, at least 10, or 12, louvres. Optionally, each of the plurality of louvres is identical to every other one of the plurality of the louvres. A greater number of louvres will contribute to a smaller ratio between the cross-sectional area through which the incoming fluid passes at the perimeter of the housing and at the centre of the housing. In other words, a greater number of louvres will make better use of the Bernoulli effect and cause a greater acceleration of the fluid. Furthermore, a greater number of louvres will further reduce noise and visual pollution, and reduce wildlife strikes. It has been found that 12 identical louvres is particularly suited to achieve these advantages, whilst not overcomplicating the design for construction and maintenance. The use of 12 louvres may be particularly suited to housings and rotors of a particular size, for example, housings configured to be connected to existing urban, roadside, or vehicular structures. It is anticipated that a housing according to the present invention could be used on an industrial scale, for example, as part of a large turbine installation. In this case, more than 12 louvres may be advantageous, for example, between 12 and 48 louvres, or between 24 and 36 louvres. However, it will be appreciated that any number of louvres may be used with any scale of housing.

In some embodiments, the base portion is configured to be connected to an existing structure. Optionally, the existing structure comprises at least one of: a roadside bollard, a roof of a building, and a chimney stack.

The housing of the present invention is advantageous because the base portion may be configured to connect to an existing structure, thereby removing the cost implications and geographical limitations. For example, for urban environments, the base portion may be configured to attach to the roof of a building, in particular to a chimney stack in place of a, perhaps now redundant, chimney pot. The building then provides elevation for the turbine within the housing and energy can be generated for domestic purposes or, for example, to supplement grid electricity. Alternatively, for example, the base portion may be configured to connect to a roadside bollard, roadside signage, or any roadside structure with sufficient structural integrity to hold the housing. Although the additional elevation may not be significant in this case, the turbulence produced by passing vehicles could be highly effective to turn the rotor and generate electricity, which could be used to power road lights or smart motorway equipment, for example, or to supplement grid electricity.

In some embodiments, the base portion comprises at least one slot. This may be advantageous, for example, if the base portion is configured to be attached to a chimney stack. The slot may then be configured to allow air to pass from the chimney stack, thereby mimicking the functionality of the replaced chimney pot.

In some embodiments, an outer diameter of the housing is between about 0.5 metres and 2 metres, or about 1 metre. For example, the outer diameter of the housing is between 0.5 metres and 2 metres. For example, the outer diameter of the housing is 1 metre. It has been found that a housing of this size is particularly suitable for connecting the housing to existing structures, for example, to connect to a domestic chimney stack or to connect to a standard roadside bollard. It will be appreciated that the dimensions of the housing may be scaled depending on the available space at the site and/or structure on which the housing is to be placed, whilst still achieving the aims and advantages of this invention.

In accordance with the invention, there is also provided a housing for use with a vertical-axis wind turbine, the housing defining a vertical axis and being configured to surround a vertical-axis wind turbine having a first and a second electrical rotor, the housing comprising: a top portion, comprising a first electrical stator configured to generate electricity when the first electrical rotor is rotated relative thereto; a base portion, comprising a second electrical stator configured to generate electricity when the second electrical rotor is rotated relative thereto; a plurality of louvres arranged circumferentially around the vertical axis and disposed between the top portion and the base portion.

In this way, by accommodating two electrical stators, the housing is able to house a self-contained VAWT, which does not require connection via its spindle to an external generator, as is required with known VAWT housings which do not comprise any part of an electrical generator. Such known housings would require connection to external generators via, for example, cogs and gears which are associated with frictional losses and undesirable maintenance requirements. The housing is thus particularly suited for mounting on, or retrofitting to, existing structures, with no external generation capabilities.

In some embodiments, the top portion and/or base portion has a convex upper surface and a convex lower surface. A convex lower surface on the top portion, and a convex upper surface on the base portion, produces a Venturi from the outer circumference of the housing to the inner circumference of the housing. In other words, a larger volume of air can be collected and funnelled to rotor blades within the housing. A convex upper surface on the top portion may be advantageous, for example, for rain run-off. Combinations of convex upper and lower surfaces for either one of, or both of, the top and base portions, may be advantageous because they allow the top and base portions efficiently to house the electrical stators.

In some embodiments, the first electrical stator is housed within the top portion and the second electrical stator is housed within the base portion. In this way, the spatial imprint of a VAWT within the housing can be reduced, by removing the need for an external generator.

In accordance with the invention, there is also provided a vertical-axis wind turbine, comprising: a spindle, defining a vertical axis; a first turbine stator and a plurality of blades, attached to the spindle, wherein the first turbine stator and a first end of the spindle are magnetically opposed to one another such that the first turbine stator supports the spindle and such that the spindle and blades are rotatable relative to the first turbine stator about the vertical axis.

Mounting a rotating spindle, which with the rotor blades could be referred to as a turbine rotor, within a turbine stator is ordinarily associated with high frictional losses. The VAWT of the present invention advantageously uses magnetic repulsion between the spindle and the turbine stator to produce a low friction, or frictionless, support for the spindle. Compared to conventional designs, efficiency is improved due to the decreased frictional losses, and the minimum wind speed to affect rotation of the spindle is reduced, allowing electricity generation at low wind speeds.

In some embodiments, the first turbine stator has a central recess formed therein, the central recess being configured to receive the first end of the spindle. A recessed turbine stator may be advantageous because repulsion may be felt by the spindle not only at its tip, but also on its sides near to the tip. Stability of the spindle, particularly when rotating, is thus increased.

In some embodiments, the vertical-axis wind turbine further comprises: a second turbine stator, wherein the second turbine stator and a second end of the spindle are magnetically opposed to one another to further support the spindle. Optionally, the second turbine stator has a central recess formed therein, the central recess being configured to receive the second end of the spindle. In this way, the stability of the spindle is increased, and the beneficial friction reduction in the support of the spindle is achieved at both of its ends, thereby further increasing the efficiency of the VAWT.

In some embodiments, the vertical-axis wind turbine further comprises: a first and a second electrical stator; and a first and a second electrical rotor, the first electrical rotor being attached to the first end of the spindle to rotate relative to the first electrical stator, and the second electrical rotor being attached to the second end of the spindle to rotate relative to the second electrical stator, such that a current is induced in the first and second electrical stators. In this way, the VAWT is able to generate electricity for use at the point of installation.

In some embodiments, the first electrical stator comprises a first magnetic element disposed at or towards the first end of the spindle, wherein the first magnetic element is magnetically opposed to the first end of the spindle. Optionally, the second electrical stator comprises a second magnetic element disposed at or towards the second end of the spindle, wherein the second magnetic element is magnetically opposed to the second end of the spindle. In this way, further stability may be provided to the spindle, either at rest or as it rotates, by additional repulsion forces along its length.

In some embodiments, the plurality of blades are V-shaped when viewed along the vertical axis, optionally wherein the blades are Savonius blades. VAWTs, particularly those not housed, can experience air flow onto their advancing rotor blades; at any one time for a horizontal air flow, half of the rotor blades will be advancing into the prevailing wind direction. It is advantageous to shape the blades in order to maximise the effect of the incoming air on the retreating blades, while minimising the effect of the incoming air on the advancing blades. It has been found that blades with a V-shaped scoop, including those designed as Savonius scoops, are particularly suited to collect incoming air on the retreating blades in order to rotate the spindle. V-shaped blades are also particularly suited to pass aerodynamically through the incoming air when advancing into the airstream, thereby reducing the drag experienced by the advancing blades. A reduction in energy losses to drag increases the efficiency of the VAWT.

In some embodiments, the vertical-axis wind turbine further comprises a plurality of radial arms, wherein each of the plurality of blades is attached to the spindle by a respective radial arm. In this way, the blades are positioned optimally to receive the incoming air flow. Furthermore, the radial arm increases the distance between the spindle and the point at which the force is applied by the incoming air to the blade. This increases the moment arm of each blade, thereby increasing the rotational speed of the spindle for a given incoming air speed.

In some embodiments, each of the plurality of blades comprise an upper section and a lower section, the sections being sloped with respect to the vertical axis towards a vertical centre of the blade, such that each blade forms a V-shape when viewed along a radius of the vertical-axis wind turbine. Blades having this shape are advantageous because the radial profile that they present differs from the rectangular gaps between the inner edges of the louvres. Rather than repeatedly trapping and then releasing air as the blades pass the louvres, producing undesirable noise pollution, such blades allow for more gradual ingress of air as they rotate. In other words, they slice past the rectangular louvre gaps. Furthermore, sloping the blades towards a vertical centre, at which a radial arm may be positioned, focusses the incoming air towards the centre of the blade, thereby limiting energy losses due to air spill at the blade edges and increasing the pressure at the centre of the blade.

The first and second electrical stator may each comprise circumferentially arranged coils, wherein the coils of the first electrical stator are offset from the coils of the second electrical stator. The coils may comprise magnets within the coil. In embodiments for which the coils comprise magnets, the housing may comprise stator air vents positioned below the first and second electrical stator in order to circulate cooling air while blocking moisture ingress.

The first and second electrical rotors may each comprise a plurality of circumferentially arranged permanent magnets, and the permanent magnets of the first electrical rotor may be offset from the permanent magnets of the second electrical rotor. As used herein in relation to the permanent magnets of the first and second electrical rotors, offset describes that the magnets of the first electrical rotor are not arranged at the same circumferential positions as the magnets of the second electrical rotor and/or that the polarities of the magnets of the first electrical stator are the opposite of the magnets of the second electrical stator. In other words, offset describes that at no circumferential position do the first and second electrical rotors share a magnet having identical position and polarity.

The same definition applies to offset of the coils. If the coils do not comprise magnets therein, offset describes position only. If the coils do comprise magnets therein, offset may refer to position and/or polarity.

"Cogging" is a disadvantageous effect in electrical generators in which the rotor does not rotate smoothly, rather it skips, or jumps, between certain rotational positions. It can be caused by magnetic interactions between the electrical stator and electrical rotor at certain rotational positions; at these positions a negative torque is applied to the electrical rotor, inhibiting its usual rotation. By providing two electrical stators, with coil arrangements offset from one another, the first and second electrical stators each experience cogging at different rotational positions of the rotor. As a result, the rotor does not feel the effects of cogging from both electrical stators at the same time, reducing the likelihood that smooth rotation is significantly disrupted, particularly at low rotational speeds. Cogging is further reduced by the offset of the permanent magnets of the first and second electrical rotors and can, in fact, be almost entirely eliminated. This reduction in cogging improves the ability of the VAWT to rotate at high speed in low and changeable wind conditions, thereby making it particularly suitable to urban environments where these conditions are common.

In accordance with the invention, there is also provided an apparatus comprising a housing and a VAWT, both in accordance with the invention. In this way, the efficiency of the VAWT may be improved, and its environmental impact reduced, by the housing in which it is positioned. The VAWT is described herein as having a spindle and plurality of blades. It will be appreciated that the housing is suitable to accommodate both lift and drag driven rotors, operating as a VAWT, including, but not limited to: Darrieus, giromill, straight wing, paddle, cross flow, and Savonius rotors.

The number of blades in the vertical-axis wind turbine may be different to the number of louvres in the housing, for example the number of blades may be greater than the number of louvres, for example the number of blades may be one or two greater than the number of louvres. For example, there may be six louvres in the housing and there may be seven or eight blades in the vertical-axis wind turbine.

It will also be appreciated that for embodiments of the invention in which the number of blades is different to the number of louvres, the number of blades may be less than the number of louvres.

By using a different number of blades and louvres, cogging effects are reduced because the blades and louvres are no longer perfectly "synchronised" with the other blades and louvres. For a matching number of blades and louvres, although an embodiment according to the invention having such a matching number remains advantageous in view of the prior art, each blade will enter, travel through, and leave an opening between the inner edges of the louvres at the same time as every other blade experiences an equivalent opening. The tendency for the blades, experiencing similar force changes at similar times, to jump, rather than rotate smoothly, can be increased as a result. By de-synchronising the forces experienced by the blades, cogging effects and noise pollution can be reduced.

BRIEF DESCRIPTION OF THE DRAWINGS

Embodiments of the invention will be described below, by way of example, with reference to the following drawings, in which.

DETAILED DESCRIPTION

The invention is described below with reference to a number of different embodiments and the aforementioned drawings. These embodiments are merely illustrative and are not intended to limit the scope of the appended claims.

Apparatus

Figure 1:
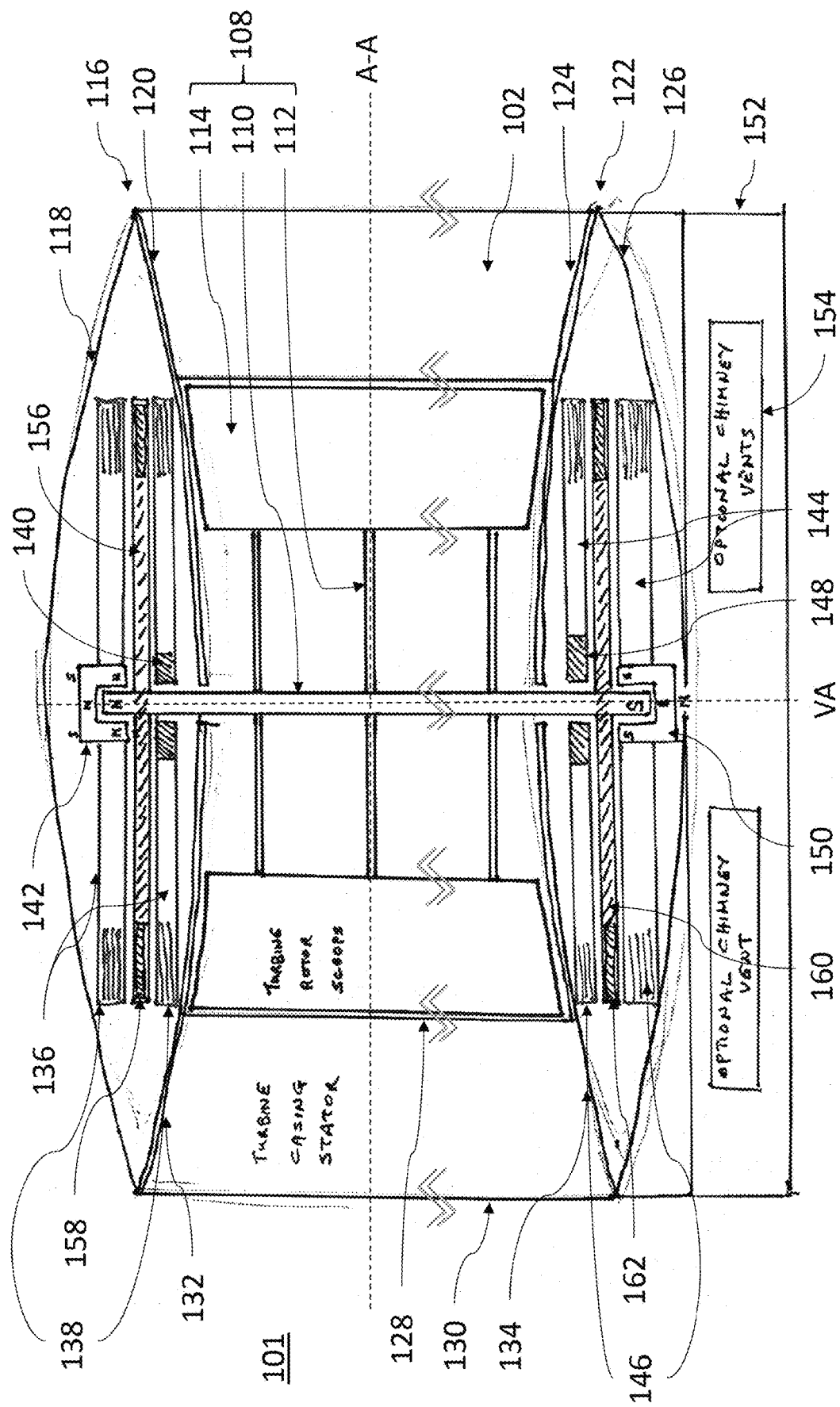
FIG. 1 illustrates an apparatus according to an embodiment of the invention, the apparatus comprising a VAWT and a housing, both according to embodiments of the invention.

Referring to FIG. 1, there is illustrated an apparatus 101 according to an embodiment of the present invention. The apparatus comprises a housing, or casing, the two being used interchangeably herein. The apparatus further comprises a vertical-axis wind turbine (VAWT). The features of the apparatus 101 may be of a different relative size to that depicted. For example, the height of the housing may be greater than its diameter.

The housing comprises a plurality of louvres 102 arranged circumferentially around a vertical axis VA shared by the housing and the VAWT. The louvres 102 are each arranged a certain radial distance from the vertical axis VA, and are equally spaced around the vertical axis VA. The distance of the arc between each louvre 102 depends on the number of louvres 102 in the housing, and the diameter of the housing. The louvres 102 are typically a metal or polymer construction, although any suitably rigid and weatherproof material is suitable.

A top portion of the housing 116 has a convex upper surface 118 and a convex lower surface 120. The radius of curvature of the convex surfaces 116 and 118 may be varied depending on the desired run-off characteristics of the upper surface 118, the desired aerodynamic characteristics of the lower surface 120, and the space required to house the rotors and stators of the VAWT. There may be an opening, or aperture, in the lower surface 120 to allow the spindle 110 to pass through.

A base portion 122 of the housing has a convex upper surface 124 and a convex lower surface 126. The radius of curvature of the convex surfaces 124 and 126 may be varied depending on the desired aerodynamic characteristics of the upper surface 124, the desired attachment and/or ventilation characteristics of the lower surface 126, and the space required to house the rotors and stators of the VAWT. There may be an opening, or aperture, in the upper surface 124 to allow the spindle 110 to pass through.

The plurality of louvres 102 are disposed between the top portion 116 and the base portion 122. The louvres 102 may be fixedly attached to one or both of the top and base portions 116/122, for example by soldering or adhesive, or by any other fixed attachment means apparent to a person skilled in the art. The louvres 102 may be releasably attached to one or both of the top and base portions 116/122, for example by a releasable mechanical fastening, or by any other releasable attachment means apparent to a person skilled in the art. A releasable attachment may allow the top and/or base portion 116/122 to be safely removed in order to construct the apparatus, perform maintenance, or perform cleaning.

Each of the plurality of louvres 102 has an inner edge 128, an outer edge 130, an upper edge 132, and a lower edge 134. The inner edge 128 is the edge of the louvre closer to the vertical axis VA. The outer edge 130 may form an outer diameter of the housing; as shown the outer edge 130 is coincident with the outer edge of the top and base portions 116/122. The inner edges 128 of the louvres 102 are arranged so as to form a first circle centred on the vertical axis VA, i.e. the inner edges 128 of the louvres 102 are all positioned on a first circle, i.e. the louvres 102 are circumferentially arranged around the vertical axis VA. The outer edges 130 of the louvres 102 are arranged so as to form a second circle, i.e. the outer edges 130 of the louvres 102 are all positioned on a second circle. One or more horizontally arranged discs (not shown), having a width similar to, for example the same as, the radial difference between the first and second circles may be positioned between the top portion 116 and base portion 122. The one or more discs may have slits within them to accommodate the louvres 102. These discs may provide additional stability and rigidity to the housing.

The geometry of the upper edge 132 of each louvre 102 matches the geometry of the lower surface 120 of the top portion 116, and the geometry of the lower edge 134 of each louvre 102 matches the geometry of the upper surface 124 of the base portion 122. Although here the upper and lower surfaces 120/124 are shown convex, thus the upper and lower edges 132/134 of the louvres 102 are necessarily concave, it will be appreciated that for the purposes of constructing the housing, any matching geometry is suitable. The louvres 102 support the top portion 116, and are therefore have sufficient compressive strength to withstand the weight of the top portion 116, and to provide sufficient rigidity to the housing.

The top portion 116 houses a first electrical stator 136 therein. As shown, the first electrical stator 136 comprises four distinct parts, however, it will be appreciated that any number of distinct parts, including one, is suitable. The first electrical stator 136 comprises symmetrical coils 138 arranged at a fixed radial distance from the vertical axis VA. Although two pairs of coils 138 are shown, it will be appreciated that any number of coils 138 may be implemented in order to generate electricity in the first electrical stator 138, as will be appreciated by a person skilled in the art. The first electrical stator 136 comprises a first magnetic element 140 at an inner radial position, i.e. at an end of the first electrical stator 136 adjacent to the vertical axis VA and thus adjacent to the spindle 110. The first magnetic element 140 may comprise more than one magnet, such that magnetic repulsion is effected in more than one direction, i.e. keeps the spindle 110 stable. Alternatively, the first magnetic element 140 may be a ring magnet.

The top portion 116 further houses a first turbine stator 142, which may be fixedly or releasably attached to the first electrical stator 136, or may be distinct. The first turbine stator 142 comprises a recessed permanent magnet, the recess being disposed centrally within the first turbine stator 142, i.e. the recess is centred on the vertical axis VA. The recess receives a first end of the spindle 110. The recess, including the base of the recess and its sides are comprised within the North magnetic pole of the first turbine stator 142, thus the portion of the first turbine stator 142 facing away from the spindle 110 is the South magnetic pole of the first turbine stator 142. The first end of the spindle 110 received within the recess of the first turbine stator 142 is the North magnetic pole of the spindle 110, such that the spindle 110 and recess of the first turbine stator 142 experience magnetic repulsion away from one another. The previously described first magnetic element 140 of the first electrical stator 136 is arranged such that the North magnetic pole is adjacent the spindle 110, such that the first magnetic element 140 and spindle 110 experience magnetic repulsion.

The first electrical stator 136 and first turbine stator 142 may be housed within, and connected to, the inner cavity of the top portion 116 in any way that would be apparent to a person skilled in the art. The connection may be fixed or releasable to facilitate cleaning and maintenance.

The base portion 122 houses a second electrical stator 144 and a second turbine stator 150 therein. The second electrical stator 144 comprises symmetrical coils 146 and second magnetic element 148. The arrangement of the second electrical stator 144, coils 146, second magnetic element 148, and second turbine stator 150 in relation to one another and to the base portion 122 is the same as that described in relation to the first electrical stator 136, coils 138, first magnetic element 140, and first turbine stator 142 in relation to the top portion 116, with two exceptions.

The magnetic polarity of the recessed end of the second turbine stator 150 is South, thus the polarity of the end of the second turbine stator 150 facing away from the spindle 110 is North. The second magnetic element 148 therefore has a South polarity.

The arrangement of the coils 146 is asymmetrical to the arrangement of coils 138, such that the first electrical rotor 156 and second electrical rotor 160 do not experience cogging at the same rotational position.

The first electrical stator 136 and the second electrical stator 144 may be connected to electrical wiring (not shown) suitable to carry the electricity generated in the coils 138/146 to an end use point. The end use point may be an integrated storage system, for example an arrangement of batteries, or may be an appliance requiring power at the time of generation. The first and second electrical stators 136/144 may be connected to one another to provide a single source of electricity, or may each comprise a separate arrangement of wiring such that they are suitable for separate use.

The base portion 122 is configured to be connected to an existing structure, for example as shown, the base portion 122 is configured to be connected to a chimney stack. The base portion 122 thus comprises a connecting section 152 to facilitate connection to the chimney stack (not shown). The connecting section 152 may be configured to connect to the chimney stack by being appropriately sized and shaped to replace a chimney pot. The connecting section 152 may comprise horizontal flanges (not shown) for connection to the flat surface of the top of the chimney stack, and these horizontal flanges may comprise apertures for connecting bolts to secure the base portion 122 to the chimney stack. Furthermore, slots, or vents, 154, may be formed within the base portion 122, optionally within the connecting section 152 in order to allow ventilation for the chimney. For connection to roadside bollards (not shown), the base portion 122 may be configured with a gradually reducing diameter, for example, in order to facilitate connection. For connection to a roof, for example, the base portion 122 may be configured with a sloping geometry in order to accommodate the similar geometry of a domestic roof.

In the exemplary embodiment of FIG. 1, the base portion 122 is configured to connect to a chimney stack. The base portion 122, and the rest of the housing, may therefore be appropriately sized in order to replace a chimney pot. For example, the diameter of the first circle, on which the inner edges 128 of the louvres 102 are positioned, may be approximately 0.6 metres. The diameter of the outer circle, on which the outer edges 130 of the louvres 102 are positioned, may be approximately 1 metre. Alternatively, the diameter of the outer circle may be approximately 1.2 metres. A height of the housing, including the base portion 122, louvres 102, and top portion 116 may be approximately 1 metre. In this way, the housing is sized appropriately to sit atop a chimney stack, and not to be significantly more visually obtrusive than the chimney pot it may replace.

The base portion could alternatively be configured to connect to an existing structure which itself is likely to move, in order for the VAWT to benefit from the relative air speed generated by the moving structure. For example, the base portion may be configured to connect the housing to a land vehicle or sea vessel, for example a boat or a yacht, in order to benefit from an increased effective wind speed caused by motion of the vehicle or vessel. Both commercial and leisure vehicles and/or vessels have significant energy requirements, to which a VAWT and housing according to the present invention could contribute, thereby improving the efficiency of the vehicle or vessel and reducing its climate impact.

The apparatus 101 also comprises a VAWT. The VAWT comprises a spindle 110, radial arms 112, blades 114, first electrical rotor 156 with permanent magnet 158, and second electrical rotor 160 with permanent magnet 162. It will be appreciated that the VAWT could also be considered to comprise the electrical stators 136/144 and the turbine stators 142/150. It is anticipated that existing VAWTs could be retrofitted with a housing according to the present invention and that, depending on the construction of the VAWT, the housing provided may or may not comprise the electrical and turbine stators.

Referring again to FIG. 1, the spindle 110 has a first end and a second end. The first end has a North magnetic polarity and is situated within the recess of the first turbine stator 142. The second end has a South magnetic polarity and is situated within the recess of the second turbine stator 150. The spindle 110 is therefore supported at both of its ends by the first and second turbine stators 142/150 and by the first and second magnetic elements 140/148, and is able to rotate relative to the stators without contacting the stators. This arrangement may be referred to as a frictionless magnetic bearing. In some embodiments, conventional mechanical bearings (not shown) are used in conjunction with the frictionless magnetic bearings in order to provide additional support for the spindle 110. The first turbine stator 142 and second turbine stator 150 may be have equal magnetic strength. Alternatively, the second turbine stator 150 may have a greater magnetic strength in order to account for the weight of the spindle 110 and attached components.

Radial arms 112 extend from the central spindle 110 to blades 114. Each blade 114 may be connected to the spindle 110 by only one radial arm 112, or by a plurality of radial arms 112, for example three as shown.

The blades 114 are sized and shaped to be positioned within and rotate relative to the lower surface 120 of the top portion 116 and the upper surface 124 of the base portion 122. The blades 114 may therefore match the geometry of these upper and lower surfaces 124/120, for example with concave upper and lower edges. An air gap is retained between the blades and the top and bottom portions 116/122 in order to reduce the likelihood of contact.

Attached to the spindle 110 near its first end is a first electrical rotor 156. The first electrical rotor 156 comprises at least one permanent magnet 158, two shown in FIG. 1 and three shown in FIG. 4, each magnet 158 spaced from the spindle 110 at a distance equal or similar to the distance of the coils 138 from the vertical axis VA. A plurality of permanent magnets 158, having alternating polarity, may be spaced around the entire circumference of the rotor, as will be described in further detail below It will be appreciated that the magnetic polarity of the components of the apparatus, as described in reference to FIG. 1, could be reversed and the same effects achieved.

Generator Operation

In use, an airstream approaches the outer edges 130 of the louvres 102. The louvres 102, in combination with the convex lower surface 132 of the top portion 116 and the convex upper surface 134 of the base portion 122 force the airstream from a relatively larger cross-section to a relatively smaller cross-section, such that the airstream accelerates in accordance with Bernoulli's equation. Additionally, the louvres 102 turn the airstream away from its initial direction of radially into the housing, such that it can be utilised more effectively by the blades 114. The incoming airstream fills the blades 114, causing them to rotate the spindle 110 within the frictionless magnetic bearing provided by the first and second electrical stators 142/150.

Attached to the rotating spindle 110 are the first and second electrical rotors 156/160, which thus rotate with the spindle 110. As the permanent magnets 158/162 rotate, they produce a rotating magnetic field. The coils 138/146 are thus subjected to changing magnetic flux, so a current is induced in the coils 138/146. The coils 138/146 are connected to a conductor (not shown) which passes the electricity generated away from the VAWT and housing.

The use of rings of stators both above and below each ring of rotor magnets makes more efficient use of the rotating magnetic field produced by the rotor magnets, which is produced above and below the magnets. The power induced in the stator can therefore be increased by the use of additional coils. The use of two rotor and stator arrangements, one in the top portion 116 and one in the base portion 122, each having a ring of stator coils both above and below the ring of rotor magnets further improves the power generated by the VAWT per rotation of the rotor.

Louvres

Figure 2:
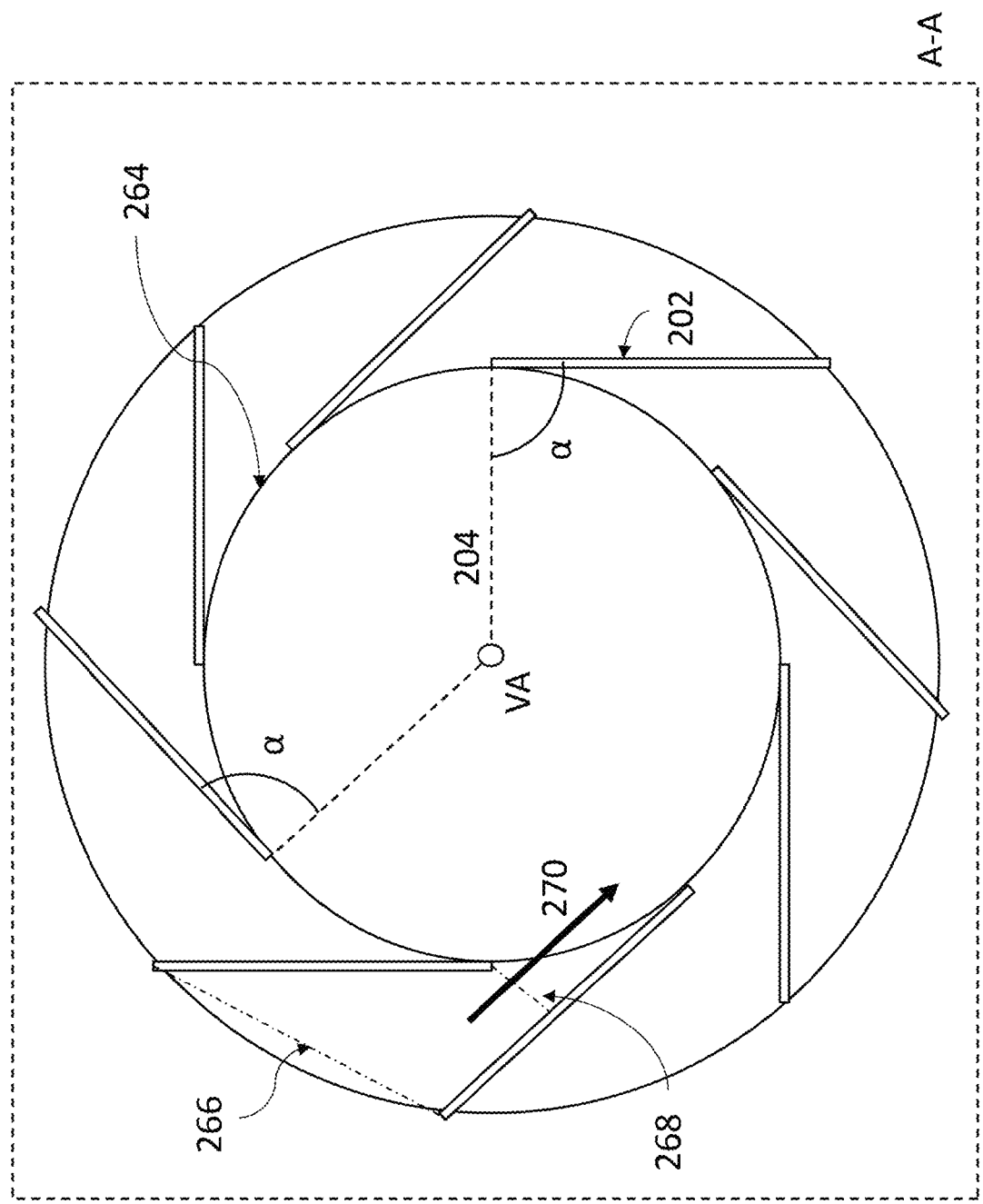
FIG. 2 illustrates a sectional top view of a plurality of louvres in a housing according to an embodiment of the invention.

Referring to FIG. 2, a sectional top view is shown of an arrangement of louvres 202 according to an embodiment of the invention. The section is of a plane A-A, the location of which is shown in FIG. 1.

In this exemplary embodiment, 8 louvres 202 are illustrated, however, it will be appreciated that this is by way of example only, and that other numbers of louvres 202 are suitable. In particular, 6, 8, 10, or 12 louvres 202 may be used. Alternatively, more than 12 louvres 202 may be used.

The louvres 202 are arranged circumferentially around the vertical axis VA. The louvres 202 are spaced equally, the inner edge of each louvre being positioned on the first circle 264 45° from each of the inner edges of the adjacent louvres. It will be appreciated that this angle will vary depending on the number of louvres 202. In this exemplary embodiment, the louvres 202 are flat sheets.

An exemplary radius 204 of the first circle 264 is illustrated. Each louvre 202 is arranged at angle α to the radius of the first circle 264 which meets the inner edge of the relevant louvre 202. It may also be said that α is the angle between each louvre 202 and a plane passing through the vertical axis VA and the inner edge of the relevant louvre 202. It may also be said that a straight line between the inner and outer edge of each louvre 202 makes an angle α to a radius 204 of the first circle at the inner edge of the louvre 202.

The angle α is the same for each louvre 202 of the housing, such that the aerodynamic characteristics of the housing are not dependent on wind direction. The angle α may be between 85° and 100° and may, for example, be 90°.

The louvres 202 may, as shown, be identical in construction. However, louvres 202 differing in construction to one another, but sharing a common angle α, will fall within the scope of the invention. There may also be additional louvres (not shown) comprised within the housing which do not share the angle α, for example smaller, intermediary, louvres, or alternatively shaped louvres. Such housings are still considered to comprise a plurality of louvres arranged at angle α.

The cross-sectional area through which the incoming air must flow is shown by line 266, and the minimum cross-sectional area through which the air flowing out of the louvres 202 must flow is shown by line 268. The area will, of course, also depend on the geometry of the lower surface of the top portion and the upper surface of the base portion of the housing. However, regardless of the geometry of the surrounding components, it can be seen that the louvres 202 provide a significantly narrowing cross-sectional area, which will effect an acceleration of the incoming air. Furthermore, as illustrated by arrow 270, the direction of the air stream flowing out of the louvres 202 is turned to better align with the tangent of the first circle 264, and therefore align with the rotation of rotor blades within said first circle 264.

In any of the examples, embodiments, and aspects described, the louvres are illustrated manipulating airflow to facilitate anti-clockwise rotation of the rotor of the VAWT. However, it will be appreciated that this is by way of example only, and that the geometry of the louvres could be mirrored in order instead to facilitate clockwise rotation of the rotor of the VAWT.

Figure 3:
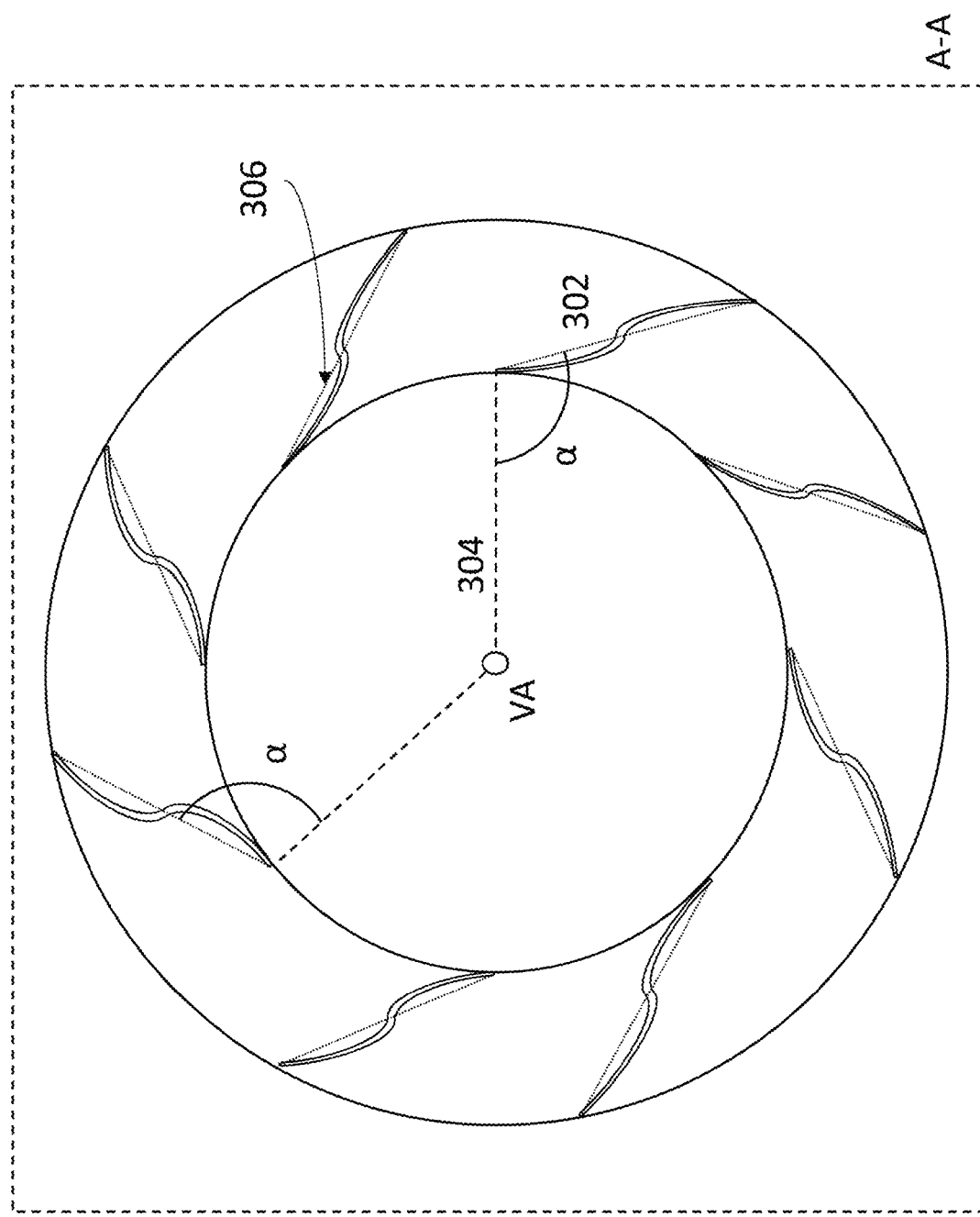
FIG. 3 illustrates an alternative sectional top view of a plurality of louvres in a housing according to an embodiment of the invention.

Referring to FIG. 3, there is an arrangement of louvres 302 similar to that shown in FIG. 2. In FIG. 2, the louvres 302 may be curved in order to induce the Coandă effect. For example, as shown in FIG. 3, each louvre 302 may be curved in more than one direction to form an "S" shape. The direction of curvature of each louvre 302 may be identical, as shown.

In embodiments such as that shown in FIG. 3, having curved louvres 302, it remains the case that the angle α is made between a straight line 306 between the inner and outer edge of each louvre 302 and a radius 304 of the first circle at the inner edge of the louvre 302. The straight line 306 between the inner and outer edge of the louvre may be referred to as the chord of the louvre. It may also therefore be said that α is the angle between the chord 306 of each louvre 302 and a plane passing through the vertical axis VA and the inner edge of the relevant louvre 302.

Blades

Figure 4B:
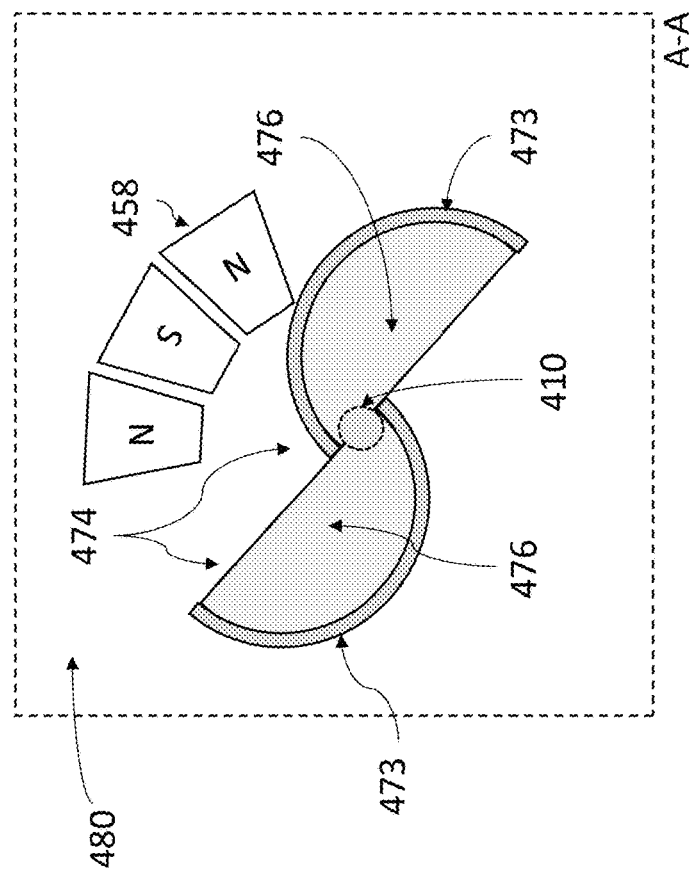
FIG. 4B illustrates a sectional top view of a turbine arrangement of a VAWT employing V shaped Savonius blades according to an embodiment of the present invention.
Figure 4A:
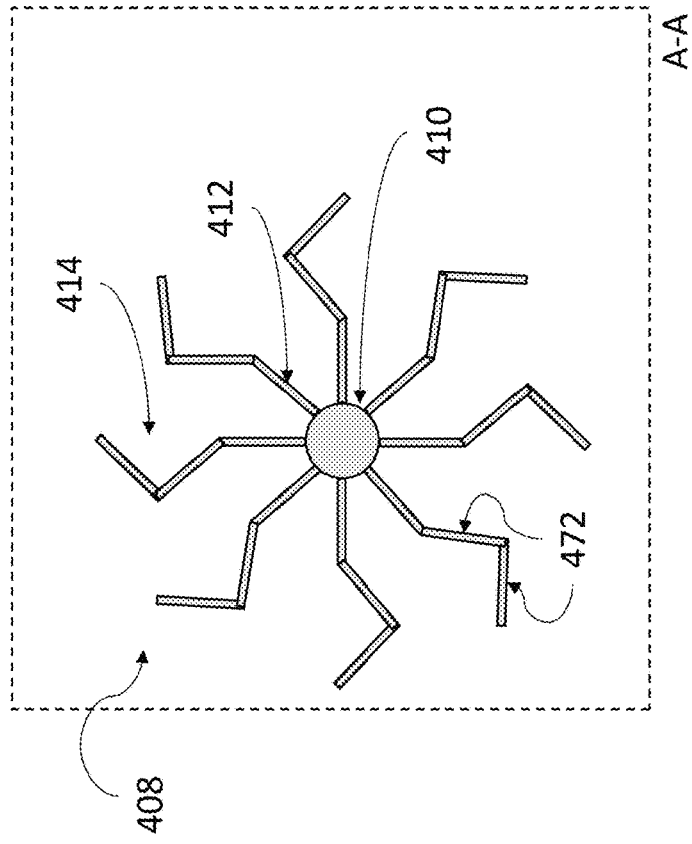
FIG. 4A illustrates a sectional top view of a turbine arrangement of a VAWT employing V shaped blades according to an embodiment of the present invention.

Referring to FIG. 4A, there is illustrated a turbine arrangement 408, including spindle 410, radial arms 412, and blades 414. Although illustrated with 8 radial arms 412 and 8 blades 414, it will be appreciated that this is exemplary only.

The blades 414 are "V" shaped when viewed along the vertical axis, being formed of two portions 472 connected at an angle. The portions 472 may be flat, as shown, or may be curved. The two portions 472 may be formed from a single bent sheet, or may be formed from two parts connected to one another. One of the portions 472 is connected to one or more radial arms 412, which in turn connect to the spindle 410.

Referring to FIG. 4B, there is illustrated an alternative turbine arrangement 480, including spindle 410, scoops 473, Savonius blades 474, and upper blade plates 476. Savonius blades, as would be understood by a person skilled in the art, are most often formed from two scoops extending radially from a vertical axis. The scoops extend to an outer radial diameter and overlap with one another at the centre of the turbine arrangement.

The scoops 473 of FIG. 4B are formed in a semi-circular shape. The scoops 473 span a length greater than the radial diameter of the turbine arrangement 480. For each scoop, an upper blade plate 476 and lower blade plate (not shown beneath upper blade plate 476) are attached to the upper and lower edges, respectively, of the semi-circular scoop 473, to form a blade 474 with an internal area defined by scoops 473 and upper/lower blade plates 476.

As shown, two blades 474 are arranged overlapping one another and facing one another. The central spindle 410 may be formed in two split portions, one connecting at the vertical axis to the upper blade plates 476, the other connecting at the vertical axis to the lower blade plates. In this way, the spindle 410 does not pass through the internal area of the blades 474. Alternatively, the spindle 410 may be formed as a single strut passing through the internal area of the blades 474. In this case, appropriate semi-circular apertures may be formed in the upper and lower blade plates 476 in order to allow the spindle 410 to pass.

In operation, the Savonius blades 474 operate in a similar manner to that described in relation to blades 114. Additionally, any air filling the blades and being turned thereby can flow into the adjacent blade 474 through the overlapping portion of the internal areas. This provides a force on the advancing blade, as well as the retreating blade, facilitating faster rotation for a given air speed. It will be appreciated that, while two Savonius blades 474 are shown, any number of Savonius blades 474 could be used. Furthermore, while semi-circular Savonius blades are shown, it will be appreciated that the scoops 473 may be other shapes, for example V-shaped.

The rotor blades 414/473 may be parallel with the vertical axis, i.e. in that they are a shape extruded in a straight line along the vertical axis. In the case of FIG. 4A, for example, the blades 414 are shaped as "V"s, extruded in a straight line parallel with the vertical axis. Alternatively, the blades may be curved with respect to the vertical axis. In other words, the upper edge of each blade may lead, or lag, its respective lower edge when the blades rotate.

One such embodiment, in which lower edge of the blade leads the upper edge as the blade rotates, is a helical Savonius rotor arrangement, employing, for example, two, or three, helical scooped blades. In a helical Savonius rotor arrangement, the upper and lower edges of each blade are positioned at different circumferential positions around the spindle. The upper edge of each blade is often configured to be subjected to the incoming wind before the lower edge, and the blade is configured to direct the incoming air both down the blade towards the lower edge, and optionally around the spindle and into one or more other blades.

Also shown in FIG. 4B are three permanent magnets 458, with alternating North (N) and South (S) polarity, attached (not shown) to the spindle 410 via a first or second electrical rotor (not shown), as described in relation to FIG. 1. Although three magnets 458 are shown, it will be appreciated that any number of alternating polarity magnets may be used. Furthermore, it will be appreciated that the magnets surround the circumference of the rotor, rather than merely a portion of it as shown.

Figure 5:
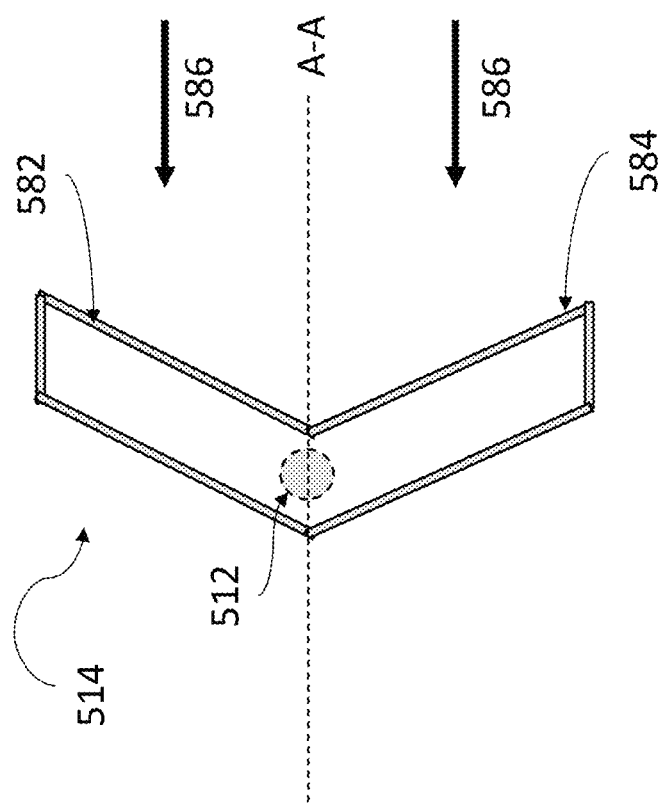
FIG. 5 illustrates a side, or radial, view of a rotor blade for use with a VAWT according to an embodiment of the present invention.

Referring to FIG. 5, there is illustrated a side, or radial, view of a rotor blade for use with a VAWT according to an embodiment of the present invention. In other words, the blade 514 is viewed as if positioned along radial arm 512.

The blade 514 has an upper section 582, a lower section 584, and a centre at which the upper and lower sections meet. The blade centre is positioned on the vertical line of symmetry of the blade 514, so may be referred to as the vertical centre. The upper section 582 and lower section 584 are sloped towards the vertical centre, such that the blade forms a V-shape. The vertical centre is further from the direction of incoming air 586 than the tips of the upper and lower sections 582 and 584, such that incoming air is funnelled towards the vertical centre of the blade 514.

Blade 514 is shown V-shaped when viewed along a radius of the VAWT, but flat when viewed along the vertical axis. It will be appreciated that the blades may be V-shaped in both regards; when viewed along a radius of the VAWT and when viewed along the vertical axis. It will also be appreciated that the upper and lower sections 582 and 584 may be angled at any appropriate degree and may, for example, be symmetrical.

It will be appreciated that the invention has been described above by way of example only, and that modifications may be made within the scope of the invention as defined by the appendant claims.

EXAMPLE

In a first illustrative example, a housing constructed in accordance with the invention was tested to determine improvements in energy recovery.

Two identical VAWTs were obtained and mounted one on top of the other, atop a domestic roof, such that they received substantially identical input wind speed and direction. This setting was chosen to test the improvement in energy recovery in a domestic setting, but it will be appreciated that similar advantages can be achieved in other settings and with other incoming wind profiles. The VAWTs each use five rotor blades, curved in the radial direction such that the blade tips are closer to the VAWT centre of rotation (spindle) than the blade centre is to the VAWT centre of rotation.

A housing in accordance with the invention was mounted around one of the two VAWTs, while the other was not housed at all. The housing used 12 louvres at an angle α of 90°, where α is the angle between a straight line between the inner and outer edge of each louvre and the radius of the VAWT at the inner edge of the louvre.

The comparative test of this example was designed to reduce the impact of the housing as much as possible, in order that the results would indicate the minimum possible improvement in revolutions per minute achievable with a housing according to the invention. Relevant test parameters included:

Mounting the un-housed VAWT on top of the housed VAWT, such that the un-housed VAWT received very marginally higher input wind speeds.

Selecting curved turbine rotor blades for the VAWT because these benefit less (compared to other common blade shapes) from the venturi effect arising from the narrowing louvres. A gap between the inner edges of adjacent louvres (the end of the venturi tunnel) and the rotor blade tips minimises the effect of the venturi.

The dimensions of the housing, other than the angle of the louvres, could not be optimised for air flow due to the use of a commercially available VAWT.

The revolutions per minute of the turbine rotor blades of each VAWT were measured over a 48-hour period. Test conditions during the 48-hour period were understandably mixed, with predominantly intermitted and low wind speeds.

On average, the housed VAWT achieved approximately 20% increased rotor revolutions per minute as compared to the un-housed VAWT.

In one exemplary 60 second period, the housed VAWT was measured at 9.9 revolutions per minute compared to 7.9 revolutions per minute measured for the un-housed VAWT; an increase of over 25%.

Certain other findings include that the improvement in speed achieved by the housed VAWT was increased by a relatively higher amount as wind speed increased. In other words, the percentage improvement arising from housing the VAWT was greater at higher wind speeds.

It is clear, therefore, that a housing in accordance with the invention achieves improved revolutions per minute for a VAWT, when compared to an un-housed VAWT. Due to the deliberate handicapping of the test arrangement, using test parameters as detailed above, the skilled person will appreciate that the improvements brought about by using a housing in accordance with the invention will, in general, be greater than those detailed above in the majority of use cases, including in higher wind speed environments and with the optimisation of other components of the housing and VAWT.

The invention claimed is:

1. An apparatus, comprising:
   a vertical-axis wind turbine comprising:
      a spindle having a first electrical rotor attached to the spindle, near a first end of the spindle and a second electrical rotor attached to the spindle, near a second end of the spindle;
      a first turbine stator;
      a second turbine stator; and
      a plurality of blades, attached to the spindle, wherein the first turbine stator and the first end of the spindle are magnetically opposed to one another such that the first turbine stator supports the spindle and such that the spindle and the plurality of blades are rotatable relative to the first turbine stator about the vertical axis, wherein the second turbine stator and a second end of the spindle are magnetically opposed to one another to further support the spindle, and wherein at least one of:
         the first turbine stator has a first central recess formed therein, the first central recess being configured to receive the first end of the spindle; and
         the second turbine stator has a second central recess formed therein, the second central recess being configured to receive the second end of the spindle;
   a housing for use with the vertical-axis wind turbine, the housing defining a vertical axis and being configured to surround the vertical-axis wind turbine, the housing comprising:
   a top portion, housing a first electrical stator configured to generate electricity when the first electrical rotor is rotated relative to the first electrical stator;
   a base portion, housing a second electrical stator configured to generate electricity when the second electrical rotor is rotated relative to the second electrical stator; and
   a plurality of louvres arranged circumferentially around the vertical axis and disposed between the top portion and the base portion;
   wherein the first electrical stator comprises a first magnetic element disposed adjacent to the first end of the spindle, wherein the first magnetic element is magnetically opposed to the first end of the spindle, and
   wherein the second electrical rotor being attached to the second end of the spindle to rotate relative to the second electrical stator, such that a current is induced in the first electrical stator and the second electrical stator.

2. The apparatus according to claim 1, wherein at least one of the top portion and the base portion has a convex upper surface and a convex lower surface.

3. The apparatus according to claim 1, wherein when the second turbine stator has the second central recess formed therein and the second central recess is configured to receive the second end of the spindle, the apparatus further comprising the first turbine stator has a central recess formed therein, the central recess being configured to receive the first end of the spindle.

4. The apparatus according to any one of claim 1, wherein the second electrical stator comprises a second magnetic element disposed adjacent to the second end of the spindle, wherein the second magnetic element is magnetically opposed to the second end of the spindle.

5. The apparatus according to claim 1, wherein the plurality of blades are V-shaped when viewed along the vertical axis.

6. The apparatus of claim 1 wherein each of the plurality of blades comprise an upper section and a lower section, the upper section and the lower section being sloped with respect to the vertical axis towards a vertical centre of each blade, such that each blade forms a V-shape when viewed along a radius of the vertical-axis wind turbine.

7. The apparatus according to claim 1, wherein the first electrical rotor and the second electrical rotor each comprise a plurality of circumferentially arranged permanent magnets, and wherein the permanent magnets of the first electrical rotor are offset from the permanent magnets of the second electrical rotor.

8. The housing according to claim 1, wherein the first electrical stator and the second electrical stator each comprise circumferentially arranged coils, and wherein the coils of the first electrical stator are offset from the coils of the second electrical stator.

9. The apparatus according to claim 1, wherein a number of blades in the vertical-axis wind turbine is different to the number of louvres in the housing.

10. The apparatus according to claim 1 wherein:
    each louvre comprises an inner edge and an outer edge;
    the inner edges of each louvre form a first circle;
    each louvre is arranged at angle α, wherein α is between about 85° and about 100°; and wherein
    α is an angle between a straight line between the inner edge and the outer edge of each louvre and a radius of the first circle at the inner edge of the louvre.

11. The apparatus according to claim 10, wherein α is 90°.

12. The apparatus according to claim 10, wherein each louvre is curved, such that the straight line between the inner edge and the outer edge of each louvre is a chord of the louvre, and α is the angle between the chord of the louvre and the radius of the first circle at the inner edge of the louvre.

13. The apparatus according to claim 12, wherein the direction of curvature of each louvre reverses once, such that each louvre is S-shaped.

14. The apparatus according to claim 1, wherein the plurality of louvres comprises at least 6.

15. The apparatus according to claim 1, wherein at least one of the plurality of louvres is substantially the same as another one of the plurality of the louvres.

16. The apparatus according to claim 1, wherein the base portion is configured to be connected to an existing structure.

17. The apparatus according to claim 16, wherein the existing structure comprises at least one of: a roadside bollard, a roof of a building, and a chimney stack.

18. The apparatus according to claim 16, wherein the base portion comprises at least one slot.

19. The apparatus according to claim 1, wherein an outer diameter of the housing is between 0.5 metres and 2 metres.

20. An apparatus, comprising:
a vertical-axis wind turbine comprising:
   a spindle having a first electrical rotor attached to the spindle, near a first end of the spindle and a second electrical rotor attached to the spindle, near a second end of the spindle;
   a first turbine stator;
   a second turbine stator; and
   a plurality of blades, attached to the spindle, wherein the first turbine stator and the first end of the spindle are magnetically opposed to one another such that the first turbine stator supports the spindle and such that the spindle and the plurality of blades are rotatable relative to the first turbine stator about the vertical axis, wherein the second turbine stator and a second end of the spindle are magnetically opposed to one another to further support the spindle, and wherein at least one of:
      the first turbine stator has a first central recess formed therein, the first central recess being configured to receive the first end of the spindle; and
      the second turbine stator has a second central recess formed therein, the second central recess being configured to receive the second end of the spindle;
a housing for use with the vertical-axis wind turbine, the housing defining a vertical axis and being configured to surround the vertical-axis wind turbine, the housing comprising:
a top portion, housing a first electrical stator configured to generate electricity when the first electrical rotor is rotated relative to the first electrical stator;
a base portion, housing a second electrical stator configured to generate electricity when the second electrical rotor is rotated relative to the second electrical stator;
a plurality of louvres arranged circumferentially around the vertical axis and disposed between the top portion and the base portion;
wherein the vertical-axis wind turbine further comprises a plurality of radial arms, wherein each of the plurality of blades is attached to the spindle by a respective radial arm among the plurality of radial arms,
wherein the first electrical stator comprises a first magnetic element disposed adjacent to the first end of the spindle, wherein the first magnetic element is magnetically opposed to the first end of the spindle, and
wherein the second electrical rotor being attached to the second end of the spindle to rotate relative to the second electrical stator, such that a current is induced in the first electrical stator and the second electrical stator.

* * * * *